Patented June 7, 1927.

1,631,695

UNITED STATES PATENT OFFICE.

FRANK H. RIDDLE, OF DETROIT, MICHIGAN, ASSIGNOR TO CHAMPION PORCELAIN COMPANY, OF DETROIT, MICHIGAN, A CORPORATION OF MICHIGAN.

PORCELAIN.

No Drawing.  Application filed June 1, 1920. Serial No. 385,512.

My invention has for its object to provide porcelains to be used, particularly, for bodies where hardness or toughness is required; for bodies where dielectric strength is required to withstand high tension currents; for insulators that are to be subjected to high temperatures; for bodies that are to be subjected to rapid thermal changes; for bodies that are to be subjected to mechanical strains or vibrations, and for bodies requiring any number of these properties, such as ball mill linings, textile eyelets, runners or guides, cooking ware, electric insulators such as spark plug porcelains, high tension porcelains, and electrodes for electrical separation in such processes as the Cottrell process.

The invention consists in the compositions of the raw batches from which the porcelains are formed, and in the processes of making the porcelains as well as in compositions of porcelains themselves.

It has been demonstrated that both feldspar and potter's flint are detrimental when incorporated into the batch composition from which porcelain products having one or more of the described properties are made. The feldspar, on account of its alkali metal content, produces a porcelain having a low dielectric strength at high temperatures. Potter's flint results in the incorporation of free quartz or silica in the porcelain, and porcelains having free quartz are subject to volumetric changes greater than those that can be explained solely by thermal expansion and are therefore liable to internal strains and fractures. It has therefore been found desirable to eliminate flint as much as possible from the batch compositions. The best substitute for quartz or flint has been found to be synthetically prepared sillimanite.

In forming the raw batches for the porcelains embodying my invention I use natural or prepared fluxes in which alkaline earth metal oxides are the basic constituents, and one or more raw or prepared materials containing alumina as their basic constituent, with the desirable amounts of raw clays consisting of kaolin alone or a mixture of kaolin and ball clays in such varied proportions as to produce the above mentioned desired properties in the bodies and in proper proportions for plasticity and practical working and firing properties, so that upon firing the batches to the required temperature porcelain bodies will be produced that are vitreous throughout and which will contain a large amount of sillimanite, a small amount of glassy matrix and no free quartz, substantially all of the silica being either dissolved or combined in or with the materials or compounds of the porcelain.

I find it preferable but not essential to use two synthetic calcines, one composed of synthetic sillimanite and the other a synthetic flux containing alkaline earth metal oxides. These two calcines are used with raw clay in forming the body batch. The alkaline earth metal oxides of the synthetic flux accelerate the formation and crystallization of sillimanite and greatly increase the toughness in the final body.

The synthetic sillimanite or the sillimanite calcine, which is the prepared material having alumina, may be formed of a mixture of raw kaolin or similar material and alumina. The synthetic flux may be formed of materials containing alkaline earth metal oxides, raw clay and flint if desired. The alkaline earth metal oxides may be introduced by using any of a great variety of the compounds containing the alkaline earth metals such as talc, magnesite, whiting, dolomite, etc.

The porcelains, however, may be formed of materials that contain the essential constituents of the final body, as by using alumina, an alkaline earth metal compound and raw clay.

The compositions involving my invention are prepared by the usual processes of milling, blunging and filter pressing and are formed into the desired shapes. They are then fired under the proper reducing, oxidizing or neutral conditons to the required cone and at the proper rate and the temperature is maintained for the proper length of time. The materials that form the raw batch are mixed in such proportion that on firing to the required temperature to thoroughly vitrify the mass, and for the proper length of time to permit the proper reactions to reach completion, the maximum amount of sillimanite and a small amount of glass matrix will be formed and practically all of the free silica will be dissolved in the glassy matrix. These proportions, however, may be varied to produce bodies having the above described properties within the proper limitations of the claims. The amount of fluxing oxides of the alkaline materials may be varied to obtain the best results from about 1.5 per cent to about 3 per cent, while the amount of the sillimanite produced in the final body will vary from about 60 per cent to about 85 per cent. The balance will be formed quite entirely of the glassy matrix, and the silica split off from the clay dissolved therein should not exceed 15 per cent to obtain the best results. This can be obtained by using a substantial amount of sillimanite in the raw batch such as from 35% to 50% of sillimanite.

Examples of compositions embodying my invention are given in the following tables:

Table No. 1.

| Raw batch for synthetic sillimanite, cone 18-20. | Raw batch for synthetic flux, cone 13. | Raw batch for the body, cone 17. | Calculated end products on fired body, cone 17. | Collected totals. | Collected totals, 100% basis. |
|---|---|---|---|---|---|
| Kaolin 71.60 $Al_2O_3$ 28.40 | Kaolin 55.80 $MgCO_3$ 18.20 Flint 26.00 | Synthetic sillimanite $Al_2O_3$-$SiO_2$ 40.00 Synthetic flux MgO.$Al_2O_3$4$SiO_2$ 20.00 (MgO 2.09). Ball clay (raw) 10.00 Kaolin (raw) 30.00 | Sillimanite 40.00 Glassy matrix 20.00 Sillimanite 25.10 $SiO_2$ 9.30 $H_2O$ driven out 5.60 | 65.10 29.30 | 69.00 31.00 ($SiO_2$ 9.84) |
| 100.00 | 100.00 | 100.00 | 100.00 | 94.40 | 100.00 |

The bodies made from the compositions involving my invention may be glazed or unglazed depending upon the use to which the objects are to be put. The "fitting" of the glaze may require certain changes in the body composition in the manner well known in the art and it is to be understood that these changes may be made without departing from the spirit of my invention.

In some of the claims I have specified a single compound of a particular class, but it is to be understood that the claims cover and comprehend in each case one or more compounds or mixtures of compounds of that class. Also where I refer to the amount of the flux in the claims I have reference to the amount of the basic oxides of the fluxing materials and it is to be understood that materials having equivalent basic oxides of the same general character are to be included and covered by such claims.

In technical works describing porcelains and similar materials, such as the article by Klein in Technical Paper No. 80 of the Bureau of Standards, the term "sillimanite" is applied to crystals having petrographic characteristics like those of natural sillimanite, and to the aluminum silicate, both amorphous and crystalline, which is formed when clay is dissociated into excess silica and an aluminum silicate higher in alumina than the original clay. The addition of alumina to the clay in proper proportion, and firing as disclosed above, results in the combination of at least some of the excess silica with alumina to form additional aluminum silicate higher in alumina than the original clay. For the sake of brevity in the appended claims, the expression "aluminous calcine" is used to cover a calcined material having a higher content of alumina than clay and adapted to form a higher percentage than clay of an aluminum silicate similar to that resulting from the dissociation of clay; and "sillimanite" is used to cover such an aluminum silicate and crystals having petrographic characteristics as close to those of natural sillimanite as the crystals resulting from the above mentioned dissociation of clay.

The term "sillimanite calcine", used in some of the claims, is intended to cover a calcined material nearer to sillimanite in composition than is clay.

While there may be some alkali metal present as an impurity in the materials used in the formation of the ceramic product, I prefer to omit any material, such as feldspar, ordinarily introduced with the intention of adding alkali flux. In the appended claims, "substantially free from alkali" is intended to exclude the addition of materials for the purpose of introducing alkali metal, while permitting the use of clay and other materials containing some alkali metal as a material.

I claim:

1. A ceramic material formed by firing sillimanite calcine and clay.

2. A ceramic material comprising sillimanite and glassy matrix, the sillimanite being in excess of the glassy matrix.

3. A ceramic material consisting of sillimanite and a glassy matrix, the sillimanite being in excess of the glassy matrix.

4. A vitrified material consisting of sillimanite and a glassy matrix, the material being substantially free from undissolved silica and from alkali.

5. A ceramic material consisting of sillimanite and a glassy matrix, the glassy matrix consisting of a material amount of alkaline earth metal silicate and dissolved silica.

6. A ceramic material consisting of 60% to 85% of sillimanite and a glassy matrix.

7. A ceramic material consisting of 60% to 85% of sillimanite and the balance of glassy matrix formed of an alkaline earth metal compound and dissolved silica.

8. A ceramic material consisting of 60% to 85% of sillimanite and the balance of glassy matrix, the glassy matrix containing practically all of the free silica of the body dissolved therein.

9. A ceramic material formed from clay and other materials and consisting of a glassy matrix and not less than 60% of sillimanite, the clay in the raw batch not exceeding 60%.

10. A ceramic material formed from aluminum silicate and a previously fused flux of low alkali content, said material having the characteristics of vitrification and high insulation under heat.

11. A ceramic material comprising sillimanite, silica and a material amount of alkaline earth metal silicate, the amount of the sillimanite being in excess of the amount of the alkaline earth metal silicate and substantially all of the silica being dissolved in the alkaline earth metal silicate.

12. A vitreous body formed by firing aluminum silicate and a fused flux of low alkali content, said body having the characteristics of low expansion and high resistance to rapid thermal changes.

13. A vitrified body having the characteristics of high resistance to rapid thermal changes and low expansion, said body formed from a batch containing aluminum silicate and an artificial flux containing magnesium silicate.

14. A vitrified porcelain body having the characteristics of low expansion, high electrical insulation under heat, high resistance to rapid thermal changes, and high mechanical strength, and formed by vitrifying clay with a previously calcined flux showing from chemical analysis silica and an alkaline earth.

15. A vitrified porcelain body having the characteristics of low expansion, high electrical insulation under heat and high mechanical strength, and formed from a batch containing calcined clay and a calcined flux showing from chemical analysis silica and an alkaline earth.

16. A vitrified porcelain body having the characteristics of low expansion, high resistance to rapid thermal changes and high mechanical strength, and formed from a batch containing sillimanite and an artificial flux showing from chemical analysis silica and an alkaline earth.

17. A porcelain body formed from a batch containing sillimanite calcine and clay.

18. A porcelain body having the characteristics of low expansion and high mechanical strength, and formed from a batch containing clay fused to vitrifaction and a previously fused artificial flux of low alkali content.

19. A porcelain body fused to vitrifaction having the characteristics of low expansion, high electrical insulation under heat and high mechanical strength, and formed from clay fused with a previously fused flux showing from chemical analysis silica and an alkaline earth.

20. A porcelain body fused to vitrifaction, and having the characteristics of high electrical insulation and low expansion, said body containing an aluminum silicate and a previously fused artificial flux comprising magnesium silicate.

21. A porcelain body fired to vitrifaction and having the characteristics of low expansion, high electrical insulation under heat and high mechanical strength, and formed from sillimanite, clay and an artificial flux of low alkali content.

22. A porcelain body having the characteristics of low expansion, high electrical insulation under heat and high mechanical strength, and formed by firing a batch containing sillimanite and an artificial flux showing from chemical analysis silica and an alkaline earth.

23. A porcelain insulator body formed by vitrifying clay and sillimanite calcine.

24. A porcelain insulator body having the characteristics of high electrical insulation at high temperatures and low expansion, said body containing aluminum silicate and an artificial flux comprising magnesium silicate.

25. A porcelain insulator body having the characteristics of low expansion, high electrical insulation under heat and high mechanical strength, and formed by fusing to vitrifaction clay and a previously fused flux of low alkali content.

26. The process of making porcelain which consists in molding into shape and firing to vitrifaction, a mixture containing clay and an artificial silicate of high electrical insulation under heat.

27. The process of making porcelain which consists in molding into shape and firing to vitrifaction, a mixture containing clay and an artificial silicate of low expansion and high electrical insulation under heat.

28. The process of making porcelain which consists in molding into shape and firing to vitrifaction, a mixture free from free silica and containing clay and another silicate of low alkali content.

29. The process of making porcelain which consists in molding into shape and firing to vitrifaction a mixture free from free silica and containing clay and another silicate containing alkaline earth metal oxide.

30. The process of making porcelain which consists in molding into shape and firing to vitrifaction, a mixture free from free silica and containing clay and sillimanite crystals.

31. The process of making porcelain which consists in molding into shape and firing to vitrifaction, a mixture containing clay and a previously fused flux of low alkali content and of high electrical insulation under heat and showing from chemical analysis silica and an alkaline earth.

32. The process of making porcelain which consists in molding into shape and firing to vitrifaction, a mixture of low alkali content containing clay and a previously fused flux of low alkali content and high electrical insulation under heat showing from chemical analysis silica and an alkaline earth.

33. The process of making porcelain which consists in molding into shape and firing to vitrifaction, a mixture substantially free from feldspar, containing clay and a previously fused flux of low alkali content showing from chemical analysis silica and an alkaline earth.

34. The process of making porcelain which consists in molding into shape and firing to vitrifaction, a mixture substantially free from free silica and containing clay and a previously fused flux of low alkali content and high electrical insulation under heat showing from chemical analysis silica and an alkaline earth.

35. The process of making porcelain which consists in molding into shape and firing to vitrifaction, a mixture substantially free from feldspar and free silica and containing clay and a previously fused flux of low alkali content and high electrical insulation under heat comprising silica and an alkaline earth.

36. The process of making ceramic material, which consists in forming a mixture of sillimanite, clay and flux and firing the mixture to produce the greatest practicable amount of sillimanite.

37. The process of making ceramic material which consists in forming sillimanite and mixing it with a flux and raw clay and firing the mixture until the product consists of sillimanite and a glassy matrix.

38. The process of making porcelain which consists in molding into shape and firing to vitrifaction a mixture containing clay, another silicate and an alkaline earth metal oxide, and substantially free from alkali metal oxide.

39. The process of making porcelain which consists in molding into shape and firing to vitrifaction a mixture containing clay, another silicate and an alkaline earth metal oxide, and substantially free from free silica and alkali metal oxide.

40. The process of making porcelain, which consists in molding into shape and firing to vitrifaction a mixture containing clay and an artificial flux of low alkali content and of high electrical insulation under heat and showing from chemical analysis silica and an alkaline earth.

41. The process of making porcelain, which consists in molding into shape and firing to vitrifaction a mixture consisting of sillimanite, clay, and flux of low alkali content and high electrical insulation under heat and showing from chemical analysis silica and an alkaline earth.

42. The process of making a ceramic material which consists in making a mixture of sillimanite calcine and a bonding material and firing the same.

43. The process of making ceramic products which consists in bonding particles of sillimanite calcine together by a temporary bond, forming the same in the shapes in which they are to be fired and firing the same to produce a permanent bond.

44. The process of making a ceramic material which consists in making a mixture of sillimanite calcine, raw clay and a flux and firing the mixture so as to produce crystals and a glassy matrix, the crystals being in excess of the glassy matrix.

45. The process of making a ceramic material which consists in making a mixture of sillimanite calcine, raw clay and an alkaline earth metal compound and firing the mixture so as to produce sillimanite and a glassy matrix.

46. The process of making a ceramic material which consists in making a mixture of sillimanite calcine, raw clay and an alkaline earth metal compound and firing the mixture so as to produce sillimanite and a glassy matrix and dissolve substantially all of the uncombined silica.

47. The process of making ceramic material which consists in mixing sillimanite calcine, a flux and raw clay and firing the mixture to produce sillimanite and a glassy matrix, the sillimanite being in excess of the glassy matrix.

48. The process of making ceramic material, which consists in mixing raw clay, sillimanite calcine and an alkaline earth metal compound, and firing the mixture so as to produce sillimanite and a glassy matrix and cause the glassy matrix to dissolve substantially all of the silica that might otherwise exist in the material as free undissolved silica.

49. The process of making a ceramic material which consists in making sillimanite calcine, calcining a mixture of alkaline earth metal oxide, silica and clay, mixing the two calcines with raw clay, and firing the mixture until sillimanite and a glassy matrix are produced.

50. The process of forming a ceramic material containing crystals that are not subject to volumetric changes, other than those that can be explained by thermal expansion, within the range of temperature used in forming said product, which consists in forming a mixture containing at least 20% of such crystals and other material from which additional crystals having said characteristics may be formed, and firing the mixture to produce such additional crystals.

51. The process of making porcelain which consists in firing material containing alumina and silica to produce the greatest practicable amount of sillimanite therefrom, forming a batch containing said fired material as an ingredient, and firing the batch.

52. The process of making porcelain which consists in firing material containing alumina and silica to produce the greatest amount of sillimanite therefrom, forming a batch containing said fired material and other materials for forming additional sillimanite, and firing the batch to produce the greatest practicable amount of additional sillimanite.

53. The method of making a ceramic material which consists in firing to a temperature sufficient to produce sillimanite, materials containing alumina and silica in the proportion by weight of between 2 and 5 parts of alumina to 2 parts of silica, mixing the fired product with a batch for ceramic material, and again firing.

54. The method of making a ceramic material which consists in firing, to a temperature sufficient to produce sillimanite, materials containing alumina and silica in proportions, by weight, of substantially 102 parts of alumina to 60 parts of silica, mixing the fired product with a batch for ceramic material, and again firing.

55. A raw batch for a ceramic body comprising, as a substantial constituent, a material the major portion of which is alumina and silica united in a form which is stable against volumetric changes up to the melting point of sillimanite.

56. A raw batch for ceramic material containing sillimanite calcine.

57. A raw batch for ceramic material containing as one of its ingredients a combination of alumina and silica in approximately the proportion of 102 parts of alumina to 60 parts of silica.

58. A raw batch for ceramic material containing, as a substantial constituent, a heat formed material at least 70% of which is sillimanite.

59. A raw batch of a ceramic material containing calcined material of which at least seventy per cent is sillimanite.

60. A raw batch for refractory bodies, comprising finely divided sillimanite and clay.

61. A raw batch for ceramic material comprising clay and sillimanite calcine.

62. A raw batch for ceramic material comprising clay, sillimanite calcine and a flux.

63. A raw batch for ceramic material comprising a mixture of sillimanite, alkaline earth metal compound and raw clay.

64. A raw batch for ceramic material comprising a mixture of sillimanite calcine, alkaline earth metal compound and raw clay.

65. A raw batch for ceramic material comprising a mixture of sillimanite calcine and clay and more than about 1.5% of alkaline earth metal oxide.

66. A raw batch for ceramic material comprising a mixture of approximately equal parts of clay and sillimanite calcine and about 1.5% to 3% of alkaline earth metal oxide.

67. A raw batch for ceramic material comprising raw clay, alkaline earth metal compound and 35% to 50% of alumina and silica combined in approximately the proportion of 102 parts of alumina to 60 parts of silica.

68. A raw batch for a porcelain body, at least 30% of the batch consisting of a heat-formed material of which at least 70% is sillimanite.

69. A raw batch for a porcelain body comprising raw clay and at least 20% sillimanite crystals.

70. A raw batch for a porcelain body comprising raw clay, flux and at least 20% sillimanite crystals.

71. A raw batch for a porcelain body consisting of clay, flux and a heat formed material at least 70% of which is sillimanite.

72. A raw batch for a porcelain insulator body comprising clay, sillimanite, and a flux low in alkali content.

73. A raw batch for a porcelain insulator body comprising 35% to 50% of sillimanite crystals, an alkaline earth metal compound and raw clay.

74. A raw batch for a porcelain insulator body consisting of sillimanite calcine, flux containing an alkaline earth metal, and clay.

75. A raw batch for a porcelain insulator body, at least 40% of which consists of a heat formed material containing alumina and silica in substantially the proportions by weight of 102 to 60, and which comprises clay and a flux of such character and proportions as to mature at a temperature above cone 15.

In witness whereof I have hereunto signed my name to this specification.

FRANK H. RIDDLE.